United States Patent [19]

Lepp et al.

[11] Patent Number: 4,875,820

[45] Date of Patent: Oct. 24, 1989

[54] CONVERTIBLE GRAIN BIN SWEEP UNLOADER

[76] Inventors: Henry P. Lepp; Herman P. Lepp, both of P.O. Box 113, Rivers, Manitoba, Canada, R0K 1X0

[21] Appl. No.: 175,346

[22] Filed: Mar. 30, 1988

[51] Int. Cl.⁴ .................................................. B65G 65/46
[52] U.S. Cl. .................................. 414/306; 198/550.1; 198/615; 198/668; 414/308; 414/310; 414/326
[58] Field of Search ............... 414/305, 306, 308, 309, 414/310, 311, 312, 313, 319, 320, 326; 198/550.6, 550.1, 615, 668

[56] References Cited

U.S. PATENT DOCUMENTS

| | | |
|---|---|---|
| 2,355,711 | 8/1944 | Dolyniuk . |
| 2,378,658 | 6/1945 | Rensch . |
| 2,397,959 | 4/1946 | Gephart . |
| 2,460,661 | 2/1949 | Tintes . |
| 2,619,224 | 11/1952 | Bobrowski et al. . |
| 2,662,634 | 12/1953 | Tintes . |
| 2,711,814 | 6/1955 | McCarthy ...................... 198/550.1 |
| 3,057,522 | 10/1962 | Reed . |
| 3,076,567 | 2/1963 | O'Dell .............................. 414/310 |
| 3,084,814 | 4/1963 | Schaefer ........................... 414/310 |
| 3,138,242 | 6/1964 | Matheson et al. . |
| 3,143,378 | 8/1964 | James et al. ................... 414/320 X |
| 3,151,749 | 10/1964 | Long ................................ 414/310 |
| 3,368,703 | 2/1968 | Lusk . |
| 3,434,605 | 3/1969 | Yung .............................. 414/308 |
| 3,499,556 | 3/1970 | Broberg ........................ 414/312 X |
| 3,536,210 | 10/1970 | Dickinson ....................... 414/310 |
| 4,386,695 | 6/1983 | Olson ........................... 414/307 X |
| 4,603,795 | 8/1986 | Bonerb .......................... 414/326 X |
| 4,625,478 | 12/1986 | Goode ............................... 52/197 |
| 4,626,161 | 12/1986 | Olson et al. ...................... 414/308 |

Primary Examiner—Robert J. Spar
Assistant Examiner—Robert S. Katz
Attorney, Agent, or Firm—Robert W. B. Bailey

[57] ABSTRACT

This invention relates to a discharge apparatus for storage bins and tanks having a central bottom outlet opening to allow a discharge conveyor to remove bulk material and a sweep conveyor within the storage bin, the improvement is that the outlet opening is adapted so that the sweep conveyor can be driven by its own motor or through gearing means driven by the discharge conveyor motor. A bearing support is provided for mounting the sweep conveyor with its own motor, and a structure is provided to mount a gear box connectably drivable by the discharge conveyor. The gear box arrangement comprises an upper and lower conventional gear box, together with a clutch to engage or disengage the sweep conveyor as required. Another improvement resides in having the sweep auger of the single drive system detachable. A further improvement lies in supplying a broom auger, in parallel with the sweep auger. The invention allows conversion of a discharge conveyor arrangement using a portable sweep conveyor, to an arrangement using a permanent sweep conveyor, without rebuilding or reconstructing the outlet opening of the discharge conveyor, previous discharge conveyors were not convertible. Further embodiments allow a double sweep auger system, and a portable sweep auger system attachable to the double gearbox arrangement.

23 Claims, 4 Drawing Sheets

CONVERTIBLE GRAIN BIN SWEEP UNLOADER

This invention relates to granule conveyors.

This invention relates more particularly to conveyor means adapted particularly to moving bulk granules such as wheat, oats rye, barley, shelled or ground corn, and which can be applied to other grains and granules of similar type and size.

Conveyors of this type are especially useful to stock or poultry raising farmers to supply grain from a storage means, such as a granary, storage bin, or silo. Conventionally such storage means have a discharge means. Typically the storage means has a cylindrical form at the base, and this base has a central sump recess forming an outlet opening for a discharge sleeve, pipe, or tube. The sleeve extends to a discharge port outside the base side wall, for access and collection of discharged material. Conveying means are present in the sleeve, generally an auger or screw type conveyor, driven by a motor mounted outside the side wall, such conveyors are shown in U.S. Pat. No. 3,057,522 issued Oct. 9, 1962 to Reed, and U.S. Pat. No. 3,151,749 issued Oct 6, 1964 to Long.

As gravity feed only removes a portion of the stored grain leaving a substantial residue behind, a sweep means is employed to convey this residue to the discharge opening. While this means can be human, it is more commonly a sweep type conveyor. This conveyor is generally radially disposed and movable about the discharge opening to sweep the granules towards the opening. Conventionally this conveyor is of auger type, such conveyors are shown in U.S. Pat. No. 2,711,814 issued June 28, 1955 to McCarthy, and U.S. Pat. No. 3,151,749 issued Oct. 6, 1964 to Long. A double sweep auger type is shown in U.S. Pat. No. 3,368,703 issued Feb. 13, 1968 to Lusk, this type is designed to be used in both loading and unloading the storage bin and free floating rather than fixed to a rotational axis.

The sweep and discharge conveyors can have separate drive means or the same drive means. In the first case the sweep conveyor is mounted with its drive means internally of the storage space. This can allow the sweep means to be portable and thus usable to discharge a series of storage bins or tanks. A typical conveyor of this type is shown by McCarthy. In the second case there is a single drive means which drives both discharge conveyor and sweep conveyor, through gearing means. Generally a clutch arrangement is provided to allow the sweep auger to be driven when required. A typical single drive means arrangement of this type is shown by Long.

The two drive systems require different arrangements at the internal end of the discharge tube, in the single drive system room must be provided in the storage means floor for the gearing and clutch arrangements, which is not necessary for the double drive means system. Thus two distinct arrangements are necessary at the outlet opening of the discharge sleeve. Because the storage means floor has to withstand substantial pressure, it is normally constructed of concrete, with the discharge sleeve set into the concrete, consequently changing the outlet opening arrangements presents difficulties. Thus two types of outlet opening of the discharge sleeve are required, and it is difficult to convert one arrangement into the other. Once the storage bin has been constructed the user is confined to one or other systems of discharge.

A single type of discharge sleeve usable in either drive system is desirable, both for simplicity in manufacture, and for convertibility.

Accordingly it is an object of the invention to provide a discharge sleeve outlet opening arrangement which can use a single drive means for both sweep and discharge conveyors, or separate drive means for sweep and discharge conveyors, for a storage bin for granular materials.

Other objects and advantages of the invention will become apparent from the following description.

The invention in a broadest aspect relates to an improved apparatus for discharging bulk material through a central bottom outlet opening of a storage bin, the outlet opening being connected by a discharge sleeve, adapted to contain a discharge conveyor, to a discharge port, the outlet opening having mounting means for a sweep conveyor within the bin, the improvement being that the mounting means comprises first means to mount a sweep conveyor having drive means independent of the discharge conveyor and second means to mount gearing means drivably connecting the discharge conveyor to a sweep conveyor. In a preferred form the first mounting means comprises means to engageably receive a bearing support having a bearing member adapted to rotatably support the sweep conveyor. In more preferred form the conveyors are augers and the first mounting means comprises means to engageably receive a bearing support having a bearing member adapted to rotatably support a sweep auger having drive means independent of the discharge auger, the bearing support being receivably engaged by the means to engageably receive a bearing support, the bearing support being in substantial alignment with the centre of the bin, a bracket rotatably supported by the bearing, the bracket supporting an auger supporting frame, a sweep auger having an inner end rotatably carried by the supporting frame, a motor carried upon the supporting frame having a driving connection with the inner end of the sweep auger to effect rotation thereof. In a yet more preferred form the bearing support has a cross saddle with legs adapted to be received in the receptacles, the cross saddle having a substantially vertical bearing member of generally cylindrical form. In a preferred form the motor has a drive shaft pulley drivably connected to a sweep auger shaft pulley by belt means, and is carried upon a tiltable mounting plate hingeably connected to a base plate attached to the auger support frame.

When used by a single drive means the invention in a broadest embodiment comprises an improved apparatus for discharging bulk material through a central bottom outlet opening of a storage bin, the outlet opening being connected by a discharge sleeve, adapted to contain a discharge conveyor, to a discharge port, the outlet opening having mounting means for a sleep conveyor within the bin, the improvement being that the mounting means comprises first means to mount a sweep conveyor having drive means independent of the discharge conveyor and second means to mount gearing means drivably connecting the discharge conveyor to a sleep conveyor, the gearing means comprising an upper portion rotatably mounted on a lower portion of the gearing, means drivably connecting the upper portion of the gearing to the sweep conveyor, means drivably connecting the lower portion of the gearing to the discharge conveyor. In a more preferred form the conveyors are augers and the gearing means comprising an upper gear box having an upper generally horizontal rotatory drive shaft, and a reduction ratio less than one, mounted upon a vertical rotatory drive shaft which is in substantial alignment with the centre of the bin, within the bottom outlet opening, the vertical drive shaft being driven by a lower gear box mounted the outlet opening, the lower gear box having a reduction ratio of substantially about one and being driven by a lower generally horizontal shaft in direct drivable rotatable connection with the discharge auger, a sweep auger having an inner end in drivable rotatable connection with the generally horizontal drive shaft of the upper gear box. These upper and lower gear boxes are conventional in nature. In a further preferred embodiment the lower gear box is mounted in bracket means attached within the outlet opening. In preferred form the lower gear box comprises clutch means to drivably connect and disconnect the lower horizontal drive shaft to the vertical drive shaft.

Desirably for convenience the horizontal drive shaft of the upper gear box is connected to the sweep auger by a universal joint.

In preferred form the sweep auger however mounted has mobile means to support an outer end of the sweep auger. A baffle substantially coextensive with the sweep auger is provided. In the portable sweep auger the baffle may be supported coaxially by means at each end of the sweep auger. While this arrangement or a similar one may be applied to the permanent sweep auger, in preferred form bracket means mounted upon said upper gearbox support the inner end of the baffle, and means support the baffle coaxially from the outer end of said sweep auger. The mobile means may comprise a wheel rotatably mounted on the outer end of the sweep auger, which effects movement of the sweep auger, when clearing the bottom of the bin. This wheel means may have a lesser diameter than said sweep auger, and support the auger upon an internal peripheral ledge of said storage bin, when said sweep auger is substantially touching said floor. The auger progresses much more slowly than it would if the auger was touching the floor, when the auger is at floor level, providing a more intensive sweeping action.

Desirably and conveniently additional outlet opening means into the discharge sleeve may be provided, between the central bottom outlet opening and the discharge port, one or more such openings may be present. This enables the discharge conveyor to remove sufficient bulk material for access to the central outlet opening, either to put a portable sweep conveyor into place, or for repair of the gearing means, it also allows sweep start up, and the sweep to move more easily.

When the horizontal drive shaft of the upper gear box is connected to the sweep auger by universal joint means, the bracket means supporting an inner end of said baffle may comprise removable pivot pin connecting means, whereby the baffle and the auger means are detachable from the upper gear box. This enables one sweep auger to be used in several storage bins, with a single drive means on each bin, which may be a portable drive means or motor. Preferably the pivot pin means and the universal joint means are substantially aligned, so that the auger can tilt when evacuating the full bin.

In another aspect of the invention in the single drive means apparatus a sweep auger means is provided comprising a first sweep auger aligned with and drivably connected to the upper drive shaft, and a second parallel spaced apart broom auger drivably connected to the first sweep auger, the second auger rotating in an opposite sense to the first auger, and supporting means whereby the first and second augers are maintained in cooperating relationship. This apparatus is otherwise similar to the single sweep auger arrangement. This arrangement has been found greatly superior in evacuating the storage bin, substantially reducing the effective evacuation time. Conveniently the first sweep auger and the second broom auger are spaced apart so that their flightings cooperatively overlap during rotation. The sprocket wheels are then preferably substantially identical in size so that in operation the flightings maintain the same basic relationship.

The sprocket wheels of the two auger embodiment, may be replaced by any similar arrangement resulting in the two augers rotating in opposite senses when in use, the two augers should be flighted in opposite senses, one being a left hand thread the other a right hand thread.

DESCRIPTION OF PREFERRED EMBODIMENTS

Preferred embodiments are indicated in the drawings where.

Figure 1:
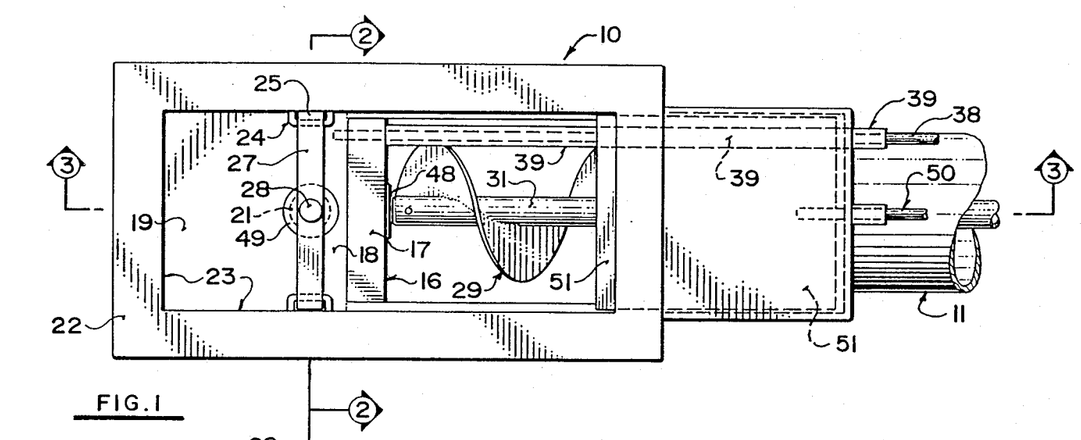
FIG. 1 is a top plan view of the outlet opening of the discharge conveyor as set up for mounting the sweep conveyor with attached drive means.

Referring to the drawings, the level of the bin floor is generally indicated by the numeral 9, the outlet opening of the discharge conveyor is generally indicated at 10, connected to discharge conveyor sleeve 11, outlet opening 10 has two internal compartments 12 and 13. Compartment 12 forms receiving sump or recess 14, to receive the gravity fed bulk granules and the throat 15 of discharge conveyor sleeve 11, compartment 13, which is not utilized in FIGS. 1, 2, and 3, has a vertical wall 16 separating compartment 13 from sump 14, wall 16 has a sloped extension 17 which becomes horizontal shelf 18, cover 19 seals compartment 13. Circular aperture 20 in vertical wall 16, and circular aperture 21 at junction of cover 19 and shelf 18 are sealed when not in use, as in FIGS. 1, 2, and 3 by plates 48, and 49 respectively, although covers, or plugs may also be used. Flange 22 rests on top of outlet opening 10, flange side walls 23 fit side and end walls of outlet opening 10, side walls 23 have projecting hollow lugs 24 which receivably engage legs 25 of bearing support 26. Bearing support 26 has cross saddle 27, and hollow cylindrical bearing member 28, bearing member 28 can rotatably support a sweep conveyor (not shown). In use slide plate 51 is withdrawn by slide plate control rod 50 (operated from outside the storage bin) allowing the contents to enter sump 14, then drive means (not shown) for discharge conveyor auger 29 are activated to drive discharge auger 29 removing bulk granules until gravity no longer feeds sump 14. At which point a sweep conveyor auger is carried into the storage chamber and mounted upon bearing member 28 of support 26. The sweep auger's drive means is started, and the sweep conveyor moves the residual bulk granules into sump 14. Bearing member 28 is mounted substantially at the central axis of the storage means.

Figure 10:
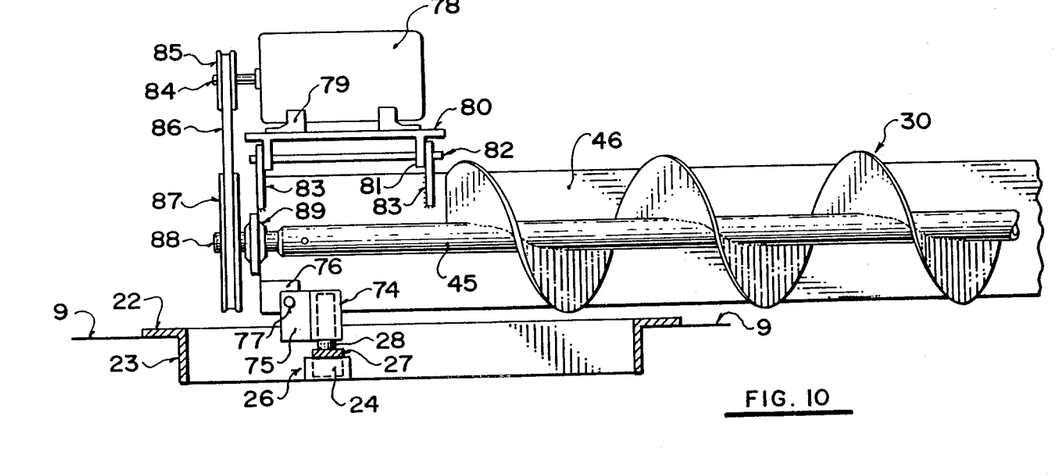
FIG. 10 shows a part sectional view of a sweep conveyor with separate drive means mounted on the bearing arrangement of FIGS. 1 to 3.

An embodiment of mounting a portable sweep is shown in FIG. 10, where the portable sweep is rotatably supported on bearing member 28, by sleeve 74 which has welded bracket 76, affixed to flange 76 of the sweep by bolt 77, conventional motor 78, is mounted on base 79 attached to tiltable plate or mounting platform 80, which has attached paired brackets 81, rotatably mounted on shaft 82, itself rotatably mounted in paired brackets 83 attached to baffle or trough plate 46. Motor 78 rotates motor shaft 84 and motor pulley 85, driving belt 86, and shaft pulley 87, shaft 88 is thus rotated, shaft 88 is journalled in bearing 89 attached to baffle 46, and is splined with auger shaft 45 of conveyor 30.

Figures 2, 4, 5:
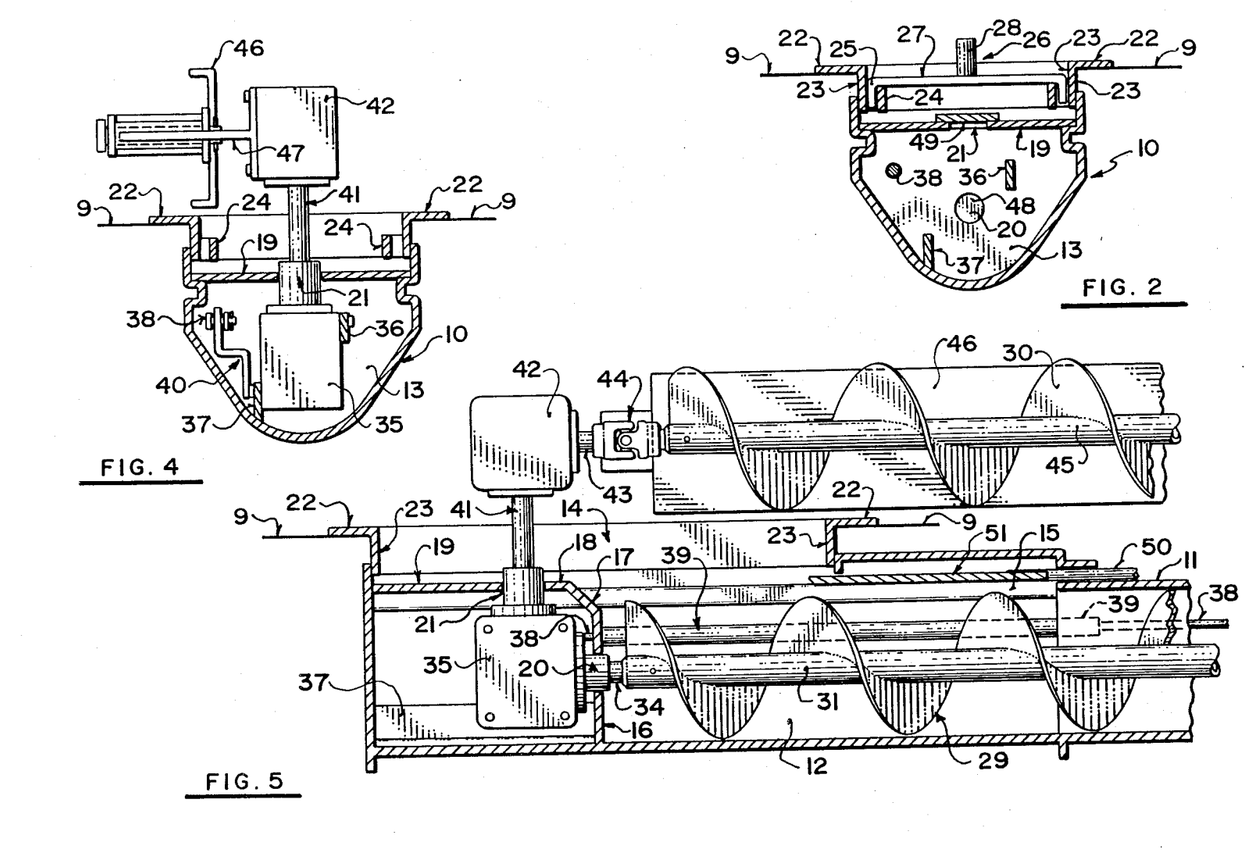
FIG. 2 is a transverse cross sectional view taken along the line 2—2 of FIG. 1.
FIG. 4 is a similar transverse cross sectional view to that of FIG. 2 of the outlet opening of the discharge conveyor when using gearing means to drive the sweep conveyor by the discharge conveyor.
FIG. 5 is a similar longitudinal cross sectional view to that of FIG. 3 of the outlet opening of the discharge conveyor when using gearing means to drive the sweep conveyor by the discharge conveyor.
Figure 3:
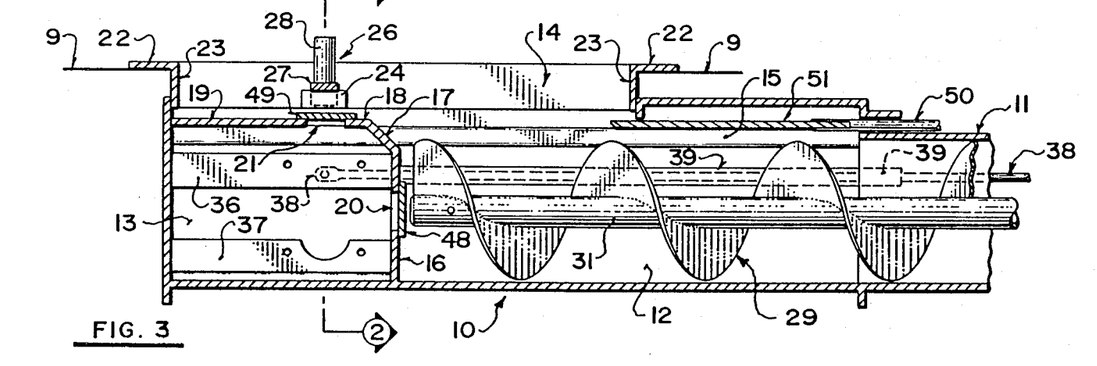
FIG. 3 is a longitudinal cross sectional view taken along line 8—8 of FIG. 1.

When the sweep auger conveyor 30 is permanently installed and driven by the same drive means as discharge auger conveyor 29, the arrangement is as in FIGS. 4 and 5, discharge auger shaft 31 is drivably connected to stub shaft 34 of lower gear box 35. Lower gear box 35 is supported by upper bracket 36 and lower bracket 37 mounted in the side walls of compartment 13 to which it is attached by bolts or similar means. Clutch control rod 38 carried in clutch control rod tube or sleeve 39, is connected to clutch lever 40 on lower gear box 35. Lower gear box 30 is drivably connected by drive shaft 41 through aperture 21 to upper gear box 42. Stub shaft 43 drivably connects upper gear box 42 through universal joint 44 to sweep auger shaft 45 of sweep auger conveyor 30, sweep auger conveyor 30, has baffle or trough means 46 extending the entire length of the conveyor 30, supported on gear box 42 by bracket arrangement 47, a bearing journalled upon shaft 45 supports the outer end the baffle at the outer end of auger shaft 45 (not shown). In use slide plate 51 is withdrawn by slide plate control rod 50 (operated from outside the storage bin) allowing the contents to enter sump 14, then discharge conveyor drive means are started with the clutch means of lower gear box 35 disengaged, until gravity no longer feeds bulk granules into recess 14. Then clutch control rod 38 is used to move clutch control lever 40 to engage the clutch means of lower gear box 35. Lower gear box 35 directly transmits the rotary torque of discharge auger shaft 31 to drive shaft 41, upper gear box 42 reduces the rotary ratio of shaft 41 to stub shaft 43, thus providing torque to rotate upper gear box about shaft 41, as well as sweep conveyor 30 about conveyor shaft 45. Desirably the reduction ratio of the lower gear box is 1:1, (discharge auger shaft:drive shaft), while that of the upper gear box is 1.5:1 (drive shaft:sweep auger shaft).

Figure 6:
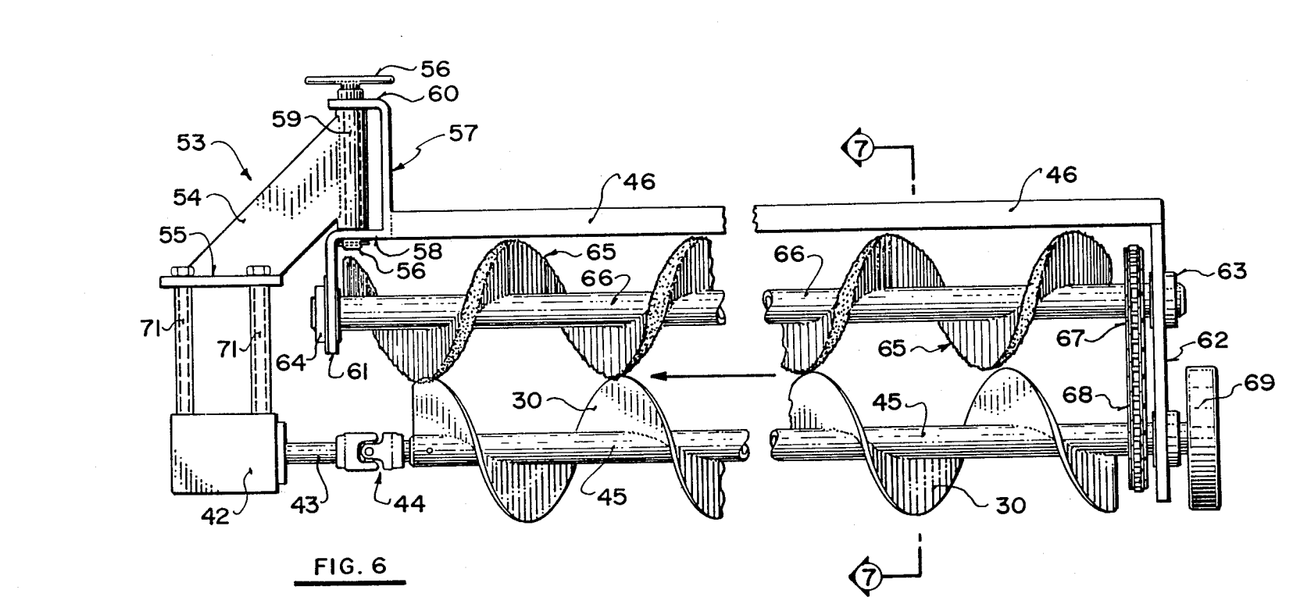
FIG. 6 shows a vertical view of the sweep conveyor, additionally comprising a broom auger to provide improved sweep.
Figure 7:
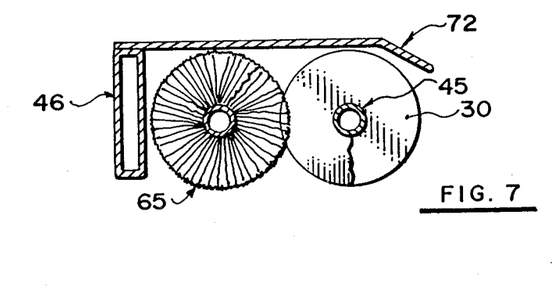
FIG. 7 shows a cross sectional view of the sweep conveyor of FIG. 6.

In FIG. 6, the gear box 42, auger 30 arrangement is essentially that shown in FIGS. 4 and 5, an additional broom auger 65 is provided, this is driven by interacting sprockets 68, and 67, and is constructed in the opposite sense to auger 30, in the Figure auger 30 has right hand flighting, while broom auger 65 has left hand flighting, the sprockets ensure that the two augers rotate in opposite senses, driving the grain along the direction shown by the arrow. Baffle or trough plate 46 is similarly mounted as before, in this case by bracket means 53 attached to upper gearbox 42, bracket means has attachment plate 55 mounted on gearbox 42 by long bolts 71, connecting plate 54 (substantially horizontal) is welded to attachment plate 55, and hollow tube 59, hollow tube 59 allows pivot pin 56 to be passed through a hole in end lug 60 of bracket 57, hollow tube 59, and a hole in plate 58, thus removably securing the auger support structure to the gearbox, pivot pin 56 and universal joint 44, allow the auger assembly to tilt during evacuation of the storage bin. Bracket 57 and plate 58 are welded or bolted to baffle 46. Inner end plate 61 and outer end plate 62 are welded to baffle 46, and are journalled to allow broom auger shaft 66 to pass through into inner bearing 64 and outer bearing 63. Inner end plate 61, need not be as shown but can also be mounted outward of universal joint 44 and pivot pin 56. Sweep auger 30 and broom auger 65 are spaced apart so their flighting overlap as much as possible. Upper gear box 42, when actuated rotates stub shaft 43, which imparts a rotation (clockwise in this case) to auger shaft 45, rotating sweep auger 30 and sprocket wheel 68, which in turn drives sprocket wheel 67, imparting a rotation (counter-clockwise in this case) to broom auger shaft 66, auger shaft 45 is journalled in outer end plate 62, and bears a wheel 69 on its outer end, which impels the auger assembly around the storage bin, when in contact with a ledge above the bin floor. In practice a top cover plate 72 (omitted in FIG. 6, so that the augers are visible), mounted on the baffle 46, covers the overlapping augers, as shown in FIG. 7.

Figure 8:
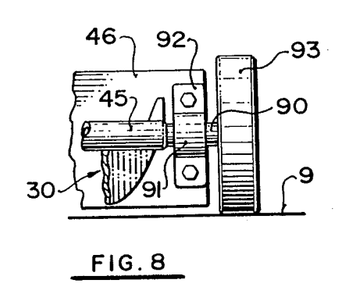
FIG. 8 shows one embodiment of a supporting outer wheel for the sweep auger.
Figure 9:
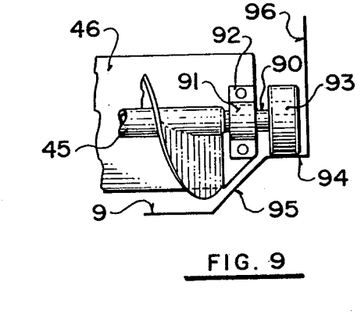
FIG. 9 shows another embodiment of a supporting outer wheel for the sweep auger.

FIGS. 8 and 9 show alternative embodiments of auger shaft support wheels in both a stub shaft 90 is splined to auger shaft 45, shaft 90 is journalled in bearing 91, mounted in bracket 92 attached to baffle 46, wheel 93 is mounted at the end of shaft 90, and rotates with shafts 90 and 45. In FIG. 8, wheel 93 rests directly on substrate 9. In FIG. 9, wheel 93 rests on ledge 94, at the base of bin wall 96, slope 95 angles inward and downward from ledge 94 to substrate 9. Both such other support wheel arrangements can be used with any auger conveyor of the invention.

Although preferred embodiments of the invention have been described above, it is not limited thereto, and it will be apparent to persons skilled in the art that numerous modifications and variations form part of the present invention insofar as they do not depart from the spirit, nature and scope of the appendant claims.

The embodiments of the invention in which an exclusive property or privilege is claimed are defined as follows:

1. In an apparatus for discharging bulk material through a central bottom outlet opening of a storage bin, said outlet opening being connected by a discharge sleeve, adapted to contain a discharge conveyor, to a discharge port, said outlet opening having mounting means for a sweep conveyor within said bin, the improvement wherein said mounting means comprises first means to mount a sweep conveyor having drive means independent of said discharge conveyor and second means to mount gearing means drivably connecting said discharge conveyor to a sweep conveyor.

2. In an apparatus for discharging bulk material through a central bottom outlet opening of a storage bin, said outlet opening being connected by a discharge sleeve, adapted to contain a discharge conveyor, to a discharge port, said outlet opening having mounting means for a sweep conveyor within said bin, the improvement wherein said mounting means comprises first means to mount a sweep conveyor having drive means independent of said discharge conveyor, and second means to mount gearing means drivably connecting said discharge conveyor to a sweep conveyor, said first means comprising means to engageably receive a bearing support having a bearing member adapted to rotatably support said sweep conveyor.

3. The apparatus of claim 2, wherein said conveyors are augers and said bearing support is receivably engaged by said means to engageably receive a bearing support, said bearing support being in substantial alignment with the centre of said bin, a bracket rotatably supported by said bearing, the bracket supporting an auger supporting frame, a sweep auger having an inner end rotatably carried by said supporting frame, a motor carried upon said supporting frame having a driving connection with said inner end of said sweep auger to effect rotation thereof.

4. The apparatus of claim 3, wherein said means to engageably receive a bearing support comprise opposed receptacles mounted within said outlet opening, said bearing support having a cross saddle with feet adapted to be received in said receptacles, said cross saddle having a substantially vertical bearing member of generally cylindrical form.

5. The apparatus of claim 4, additionally comprising a wheel means mounted on an outer end of said sweep auger, to support said auger, said wheel means having a lesser diameter than said sweep auger, and supporting said auger upon an internal peripheral ledge of said storage bin, when said sweep auger is substantially touching said floor.

6. The apparatus of claim 4, additionally comprising a baffle substantially coextensive with said sweep auger, means supporting said baffle coaxially from the ends of said sweep auger.

7. The apparatus of claim 3 wherein said motor has a drive shaft pulley drivably connected to a sweep auger shaft pulley by belt means, and is carried upon a tiltable mounting plate hingeably connected to a base plate attached to said auger support frame.

8. In an apparatus for discharging bulk material through a central bottom outlet opening of a storage bin, said outlet opening being connected by a discharge sleeve, adapted to contain a discharge conveyor, to a discharge port, said outlet opening having mounting means for a sweep conveyor within said bin, the improvement wherein said mounting means comprises first means to mount a sweep conveyor having drive means independent of said discharge conveyor and second means to mount gearing means drivably connecting said discharge conveyor to said sweep conveyor, said gearing means comprising an upper portion rotatably mounted on a lower portion of said gearing, means drivably connecting said upper portion of said gearing to said sweep conveyor, means drivably connecting said lower portion of said gearing to said discharge conveyor.

9. The apparatus of claim 8, wherein said conveyors are augers and said gearing means comprising an upper gear box having an upper generally horizontal rotatory drive shaft, and a reduction ratio less than one, mounted upon a vertical rotatory drive shaft which is in substantial alignment with the centre of said bin, within the bottom outlet opening, said vertical drive shaft being driven by a lower gear box mounted in said outlet opening said lower gear box having a reduction ratio of substantially about one and being driven by a lower generally horizontal shaft in direct drivable rotatable connection with said discharge auger, said sweep auger having an inner end in drivable rotatable connection with said generally horizontal drive shaft of said upper gear box.

10. The apparatus of claim 9, wherein said lower gear box is mounted in bracket means attached within said outlet opening.

11. The apparatus of claim 9, wherein said lower gear box comprises clutch means to drivably connect and disconnect the lower horizontal drive shaft to the vertical drive shaft.

12. The apparatus of claim 11, additionally comprising a wheel means mounted on an outer end of said sweep auger, to support said auger, said wheel means having a lesser diameter than said sweep auger, and supporting said auger upon an internal peripheral ledge of said storage bin, when said sweep auger is substantially touching said floor.

13. The apparatus of claim 11, additionally comprising a baffle substantially coextensive with said sweep auger, means supporting said baffle coaxially from the ends of said sweep auger.

14. The apparatus of claim 11, additionally comprising a baffle substantially coextensive with said sweep auger, bracket means mounted upon said upper gearbox supporting the inner end of said baffle, and means supporting said baffle coaxially from the outer end of said sweep auger.

15. The apparatus of claim 11, wherein said horizontal drive shaft of said upper gear box is connected to said sweep auger by a universal joint.

16. The apparatus of claim 14, wherein said horizontal drive shaft of said upper gear box is connected to said first sweep auger by universal joint means, and said bracket means supporting an inner end of said baffle comprise removable pivot pin connecting means, whereby said baffle and said auger means are detachable from said upper gear box.

17. The apparatus of claim 16, wherein said pivot pin means and said universal joint means are substantially aligned.

18. In an apparatus for discharging bulk material through a central bottom outlet opening of a storage bin, said outlet opening being connected by a discharge sleeve, adapted to contain a discharge auger, to a discharge port, said outlet opening having mounting means for a sweep auger within said bin, the improvement wherein said mounting means comprises first means to mount sweep auger means having drive means independent of said discharge auger and second means to mount gearing means drivably connecting said discharge auger to said sweep auger means, said gearing means comprising an upper gear box having an upper generally horizontal rotatory drive shaft, and a reduction ratio less than one, mounted upon a vertical rotatory drive shaft which is in substantial alignment with the centre of said bin, within the bottom outlet opening, said vertical drive shaft being driven by a lower gear box mounted in said outlet opening said lower gear box having a reduction ratio of substantially about one and being driven by a lower generally horizontal shaft in direct drivable rotatable connection with said discharge auger, said sweep auger means comprising a first sweep auger aligned with and drivably connected to said upper drive shaft, and a second parallel spaced apart broom auger drivably connected to said first sweep auger, said second auger rotating in an opposite sense to said first auger, and supporting means whereby said first and second augers are maintained in cooperating relationship.

19. The apparatus of claim 18, additionally comprising a baffle substantially coextensive with said sweep auger means, bracket means mounted upon said upper gearbox supporting an inner end of said baffle, an outer end of said baffle mounting said supporting means.

20. The apparatus of claim 19, additionally comprising a wheel means mounted on an outer end of said first sweep auger means, said wheel means having a lesser diameter than said sweep auger, and supporting said auger upon an internal peripheral ledge of said storage bin, when said sweep auger is substantially touching said floor.

21. The apparatus of claim 19, wherein said horizontal drive shaft of said upper gear box is connected to said first sweep auger by a universal joint, and said bracket means supporting an inner end of said baffle comprise a pivot pin connecting means, whereby said baffle and said auger means are detachable from said upper gear box.

22. The apparatus of claim 21, wherein said pivot pin means and said universal joint means are substantially aligned.

23. The apparatus of claim 18, wherein said first sweep auger and said second broom auger are spaced apart so that their flightings cooperatively overlap.

* * * * *

UNITED STATES PATENT AND TRADEMARK OFFICE
CERTIFICATE OF CORRECTION

PATENT NO. : 4,875,820
DATED : October 24, 1989
INVENTOR(S) : Henry P. Lepp

It is certified that error appears in the above-identified patent and that said Letters Patent is hereby corrected as shown below:

On the title page, item [76] should read --John P.D. Lepp--.

Signed and Sealed this

Nineteenth Day of June, 1990

Attest:

HARRY F. MANBECK, JR.

*Attesting Officer*  *Commissioner of Patents and Trademarks*